(12) United States Patent
Wiese et al.

(10) Patent No.: US 9,819,500 B2
(45) Date of Patent: Nov. 14, 2017

(54) SYSTEM AND METHOD FOR ISOLATING AND PROTECTING A POE (POWER OVER ETHERNET) DEVICE

(71) Applicant: Adtran, Inc., Huntsville, AL (US)

(72) Inventors: James B. Wiese, Toney, AL (US); Daniel M. Joffe, Owens Crossroads, AL (US); Steven M. Robinson, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 148 days.

(21) Appl. No.: 14/837,010

(22) Filed: Aug. 27, 2015

(65) Prior Publication Data

US 2016/0064924 A1 Mar. 3, 2016

Related U.S. Application Data

(60) Provisional application No. 62/043,200, filed on Aug. 28, 2014.

(51) Int. Cl.
| | |
|---|---|
| *H01C 7/12* | (2006.01) |
| *H04L 12/10* | (2006.01) |
| *H02H 3/20* | (2006.01) |
| *H02H 3/22* | (2006.01) |
| *H02H 7/22* | (2006.01) |
| *H02H 9/00* | (2006.01) |
| *H02H 9/04* | (2006.01) |

(52) U.S. Cl.
CPC ............... *H04L 12/10* (2013.01); *H02H 3/20* (2013.01); *H02H 3/22* (2013.01); *H02H 7/22* (2013.01); *H02H 9/005* (2013.01); *H02H 9/04* (2013.01); *H02H 9/042* (2013.01)

(58) Field of Classification Search
USPC .................................... 361/56, 111, 117–119
See application file for complete search history.

(56) References Cited

U.S. PATENT DOCUMENTS

| | | |
|---|---|---|
| 8,243,412 B2 | 8/2012 | Wiese et al. |
| 8,358,492 B2 | 1/2013 | Wiese et al. |
| 2009/0161281 A1* | 6/2009 | Maggiolino ............. H02H 9/04 361/111 |
| 2011/0128661 A1* | 6/2011 | Wiese ................. H04L 12/2881 361/119 |

OTHER PUBLICATIONS

Adtran; NetVanta Ethernet Port Protection Device; P/N 1700502G1, 1702595G16; Data Sheet; 2012.
Adtran; Single Port Poe Injector; P/N 1700920F1; Data Sheet; 2012.

* cited by examiner

*Primary Examiner* — Danny Nguyen
(74) *Attorney, Agent, or Firm* — Smith Tempel Blaha LLC; Michael J. Tempel

(57) ABSTRACT

A surge protection device includes an isolating transformer configured to conduct an Ethernet data signal on a wire pair and configured to provide voltage surge protection for Ethernet equipment coupled to the wire pair, and a power supply coupled to the isolating transformer and configured to conduct a DC voltage signal from the wire pair and configured to provide voltage surge protection for the Ethernet equipment coupled to the wire pair.

20 Claims, 7 Drawing Sheets

SYSTEM AND METHOD FOR ISOLATING AND PROTECTING A POE (POWER OVER ETHERNET) DEVICE

RELATED APPLICATION

The present application claims priority to and the benefit of the filing date of U.S. Provisional Application No. 62/043,200, entitled "Methods and Systems for Combining Isolation and Protection for PoE (Power over Ethernet)" filed on Aug. 28, 2014, the entirety of which is incorporated into this document by reference.

BACKGROUND

An Ethernet interface, such as a 10/100/1000 BaseT Ethernet, has traditionally been treated as intra-building (indoor only) interface much like a RS-232 interface. Power over Ethernet (PoE) was developed to provide electrical power and network data capability over standard Ethernet cabling to locations where AC (alternating current) power would be inconvenient, expensive, or otherwise infeasible to install. Even in situations where AC power is feasible, PoE offers additional advantages. PoE is simple to set up and because it operates at low voltage (typically Direct Current (DC) voltage of approximately 48V), and typically does not require an electrician to install. Another benefit is that data and power are combined on a single cable, which reduces cabling requirements and complexity. In most PoE installations, existing network cabling infrastructure can be used. The flexibility that PoE offers by combining network signal and power into a single Ethernet cable makes it highly desirable for many communication applications.

A typical PoE installation uses two twisted pairs of cable in a standard TIA-568B CATS/6 RJ-45 Ethernet cable connection to carry Ethernet data and DC power to a PoE enabled device. The Ethernet interface was not intended for deployment in outside (outdoor) plant environments where the interface may be exposed to high-energy lightning and power fault events. Safety organizations, such as Underwriters Laboratories (UL), and corresponding electrical safety standards have not provided protection requirements or guidelines for Ethernet interfaces that are exposed to outdoor faults. As a result, placing products having only indoor Ethernet interface protection in an outdoor environment is generally undesirable. High-energy lightning and power faults are capable of causing significant product damage and also pose electrical safety and fire hazards.

Further, standards such as Telcordia GR-1089-CORE, and Institute of Electrical and Electronics Engineers (I.E.E.E.) Ethernet specifications assume limited exposure to mild electrical transients. The mild electrical transients typically encountered by an indoor Ethernet cable can be induced from adjacent wiring and/or electrical equipment (e.g., motors, copiers, elevators, medical equipment, etc.). Generally, the existing protection schemes for an indoor Ethernet interface typically comprises transient suppression circuits designed to handle small intra-building electrical transients. Thus, the use of Ethernet cables and interfaces has typically been limited to indoor environments.

Service providers have undertaken initiatives that expose either the service provider's Ethernet interfaces or the customer's Ethernet interfaces to an outdoor environment. Hence, Ethernet equipment may be damaged from exposure to a high-energy electrical impulse, such as lightning (either induced or via a ground potential rise (GPR)) or an alternating current (AC) power fault. Not only is such an exposure a violation of one or more safety listings, but the provider's placement of equipment may cause loss of service, damage to the equipment, and/or injury to a user.

There exist many conventional surge protection systems for protecting various products from high voltage and/or current surges. However, many such protection systems would degrade the performance of an Ethernet signal such that the requirements of applicable Ethernet standards, such as I.E.E.E. 802.3, would be violated. In this regard, I.E.E.E. 802.3 sets limits on both the insertion loss and return loss of the Ethernet interface at frequencies up to 100 megaHertz (MHz). Many protection schemes, having been developed for much lower bandwidth circuits, are therefore not suitable for Ethernet.

Moreover, there is a need for a surge protection system that protects equipment coupled to an outdoor Ethernet cable. It would be desirable for such a surge protection system to be compliant with applicable Ethernet transmission standards, such as I.E.E.E. 802.3.

SUMMARY

Embodiments of a surge protection device include an isolating transformer configured to conduct an Ethernet data signal on a wire pair and configured to provide voltage surge protection for Ethernet equipment coupled to the wire pair, and a power supply coupled to the isolating transformer and configured to conduct a DC voltage signal from the wire pair and configured to provide voltage surge protection for the Ethernet equipment coupled to the wire pair.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

Exemplary embodiments of the invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

The present disclosure generally pertains to surge protection systems that protect outdoor plant equipment from high-energy electrical impulses and surges. In an exemplary embodiment, a protection system is used for protecting Ethernet equipment that is coupled to an Ethernet cable that may be partially or completely outdoors. The protection system provides electrical impulse protection and fault protection and remains capable of coupling signal energy between an Ethernet cable and Ethernet equipment without significantly degrading Ethernet performance. The protection system is also capable of coupling power from an Ethernet cable to powered Ethernet equipment using the above-mentioned PoE methodology. However, the protection system, while allowing the desirable Ethernet signals and power to pass between the cable and the equipment, prevents the electrical voltages and currents of high-energy surges, such as surges from lightning or AC power faults, from damaging the Ethernet equipment.

Prior U.S. Pat. No. 8,243,412 and U.S. Pat. No. 8,358,492 describe embodiments of a surge protection system and are hereby incorporated into this document by reference, as if fully set forth herein.

Definitions

PoE device: a device coupled to an Ethernet media and configured to use power over Ethernet. A PoE device can be power sourcing equipment (PSE) configured to provide a PoE voltage signal, can be a powered device (PD) configured to use the PoE voltage signal, or can be a surge protection device configured to provide an Ethernet signal interface and provide PoE voltage and also isolate and protect a PSE device or a PD device.

IEEE 802.3af: Provides 48 VDC up to an effective load of approximately 15.4 watts (W) to a distance of approximately 100 meters (m).

IEEE 802.3at: Provides 48 VDC up to an effective load of approximately 30 watts (W). It is understood that standards evolve over time and such evolution of the standards is anticipated.

Endspan Injector: Power is injected into the Ethernet cable by an OSI (Open Systems Interconnect) Layer 2 Ethernet switch, which is also configured to transport Ethernet data through the Ethernet cable.

Midspan injector: Power is injected into the Ethernet cable using an in-line device that has a data-in port and a data+power-out port. The device may be a small form factor device and may have an external power supply.

PoE injector: Typically a midspan injector, also referred to as a "single-port" injector. A single port injector typically has an input having a single port non-PoE Ethernet interface and an output having a single port PoE interface. As will be described below, embodiments of the surge protection system described herein describe a system having an input having one or more PoE Ethernet interfaces and an output having one or more protected PoE interfaces.

Figure 1:
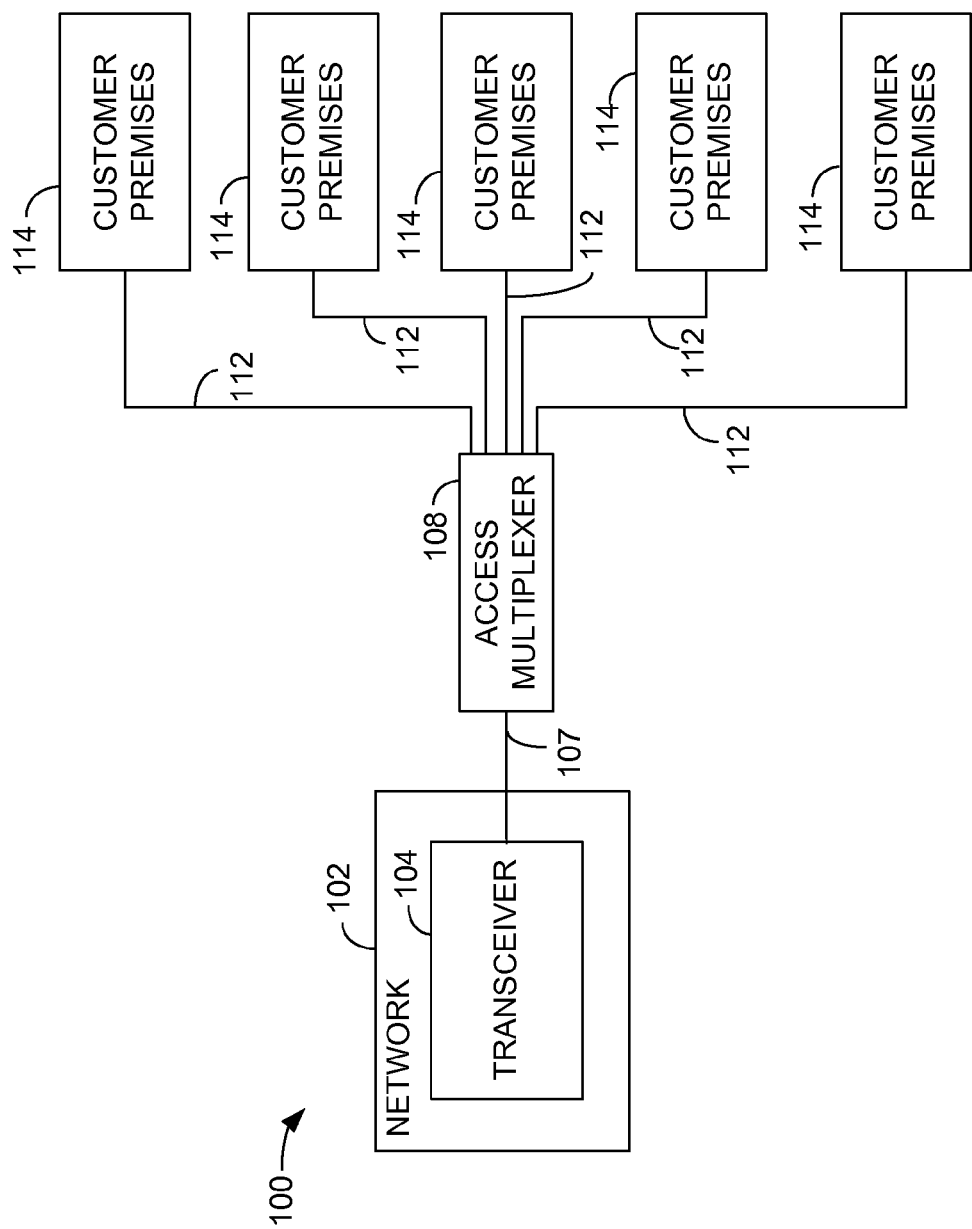
FIG. 1 is a block diagram illustrating an exemplary embodiment of a communication system.

FIG. 1 shows an exemplary embodiment of a communication system 100. The system 100 comprises a communication network 102. At least one network transceiver 104 is coupled to an access multiplexer 108, such as a Digital Subscriber Line Access Multiplexer (DSLAM), via at least one communication medium 107. For example, the communication medium 107 may comprise at least one conductive connection, such as at least one twisted wire pair, at least one optical fiber, or another connection. The access multiplexer 108 is also coupled to a plurality of customer premises 114 via a plurality of communication media 112. Each communication medium 112 may comprise at least one conductive connection, such as at least one twisted wire pair, or another connection. In an exemplary embodiment, at least one of the communication media 112 comprises an Ethernet cable, which typically has a plurality of conductive connections bundled within a cable. For example, one type of Ethernet cable has four twisted wire pairs bundled within a cable, but Ethernet cables with a different number of conductive connections are also possible.

The access multiplexer 108 is configured to receive a high speed data stream from the network 102 and to demultiplex the received data across the plurality of communication media 112, which often extend for shorter distances relative to the distance of the communication medium 107. Further, the access multiplexer 108 is configured to receive data from a plurality of the customer premises 114 and to multiplex the received data onto the communication medium 107. The use of an access multiplexer to multiplex and demultiplex data is generally well known and will not be described in detail herein for brevity purposes.

Figure 2:
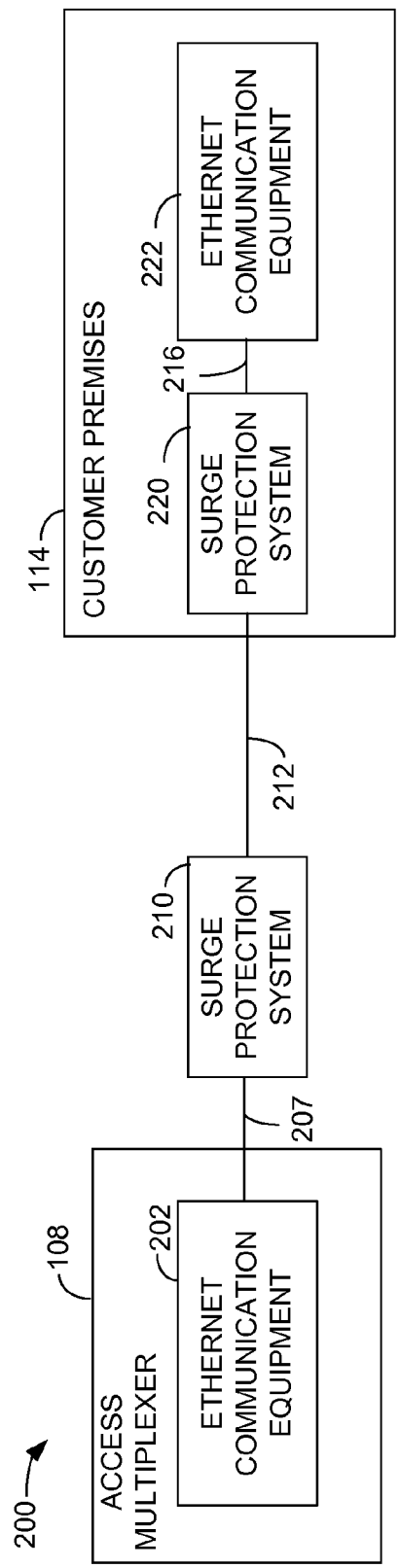
FIG. 2 is a block diagram illustrating an access multiplexer, such as is depicted in FIG. 1, coupled to Ethernet communication equipment at a customer premises via an Ethernet cable. The access multiplexer and the Ethernet communication equipment at the customer premises are protected by surge protection systems.

FIG. 2 shows an exemplary embodiment in which a customer premises 114 is coupled to the access multiplexer 108 via an Ethernet cable 212, such as a category (CAT) 5 or CAT 6 cable, for example. The access multiplexer 108 is typically located outdoors (e.g., mounted on a telephone pole, or otherwise located outdoors), and the Ethernet cable 212 runs outdoors from the customer premises 114 to the access multiplexer 108. The Ethernet cable 212 is, therefore, exposed to high voltage and/or current pulses from lightning, AC power faults, and/or other types of high energy electrical faults. As shown in FIG. 2, one end of the cable 212 is coupled to a surge protection system 210, which is coupled to Ethernet communication equipment 202 of the access multiplexer 108 via an Ethernet cable 207, and the other end of the cable 212 is coupled to a surge protection system 220, which is coupled to Ethernet communication equipment 222 of the customer premises 114 via an Ethernet cable 216. The surge protection system 210 protects the access multiplexer 108 and, in particular, the Ethernet communication equipment 202 from high energy surges, and the surge protection system 220 protects the Ethernet communication equipment 222 of the customer premises 114 from high energy surges. Although two surge protection systems 210 and 220 are shown in FIG. 2, alternative embodiments may be implemented having more or fewer surge protection systems.

Figure 3:
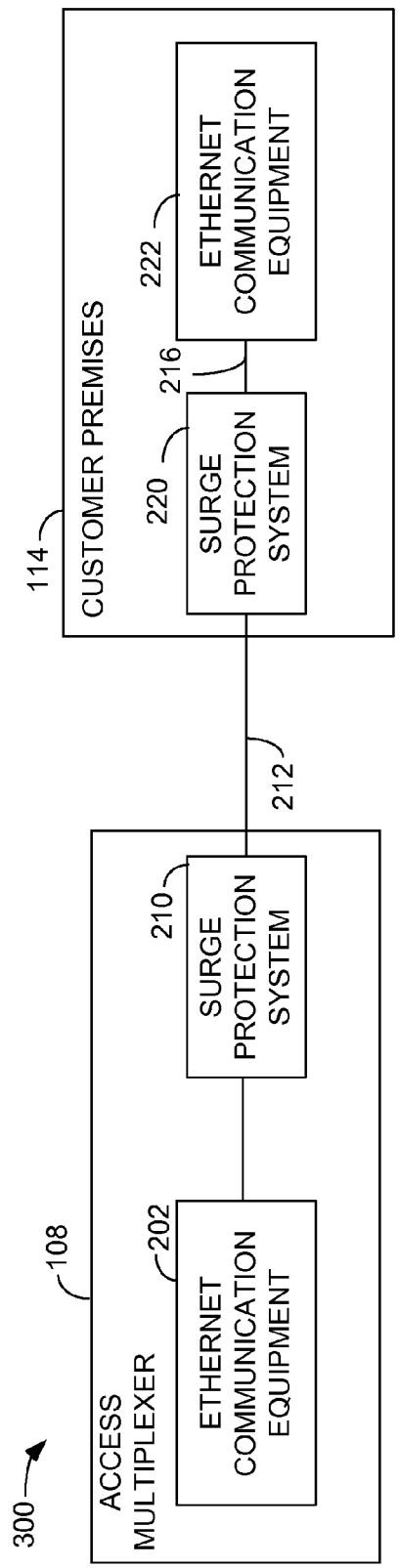
FIG. 3 is a block diagram illustrating an access multiplexer, such as is depicted in FIG. 1, coupled to Ethernet communication equipment at a customer premises via an Ethernet cable. The access multiplexer incorporates a surge protection system.

In an exemplary embodiment, each surge protection system 210, 220 is a stand-alone system. For example, each surge protection system 210, 220 may form a dongle, or other device, that is detachably coupled to and, therefore, can be decoupled from the cable 212 and/or the Ethernet communication equipment 202, 222. Alternatively, either surge protection system 210, 220 may be integrated with the Ethernet communication equipment 202, 222, respectively. For example, in an exemplary embodiment, the surge protection system 210 is integrated with the Ethernet communication equipment 202 and housed by the access multiplexer housing (not shown in FIG. 2), which also houses the Ethernet communication equipment 202. Thus, the surge protection system 210 may be incorporated into the access multiplexer 108, as shown in the communication system 300 of FIG. 3. However, in another exemplary embodiment, the surge protection system 210 is externally attached to the access multiplexer 108. Various other configurations are possible in other embodiments.

Figure 4:
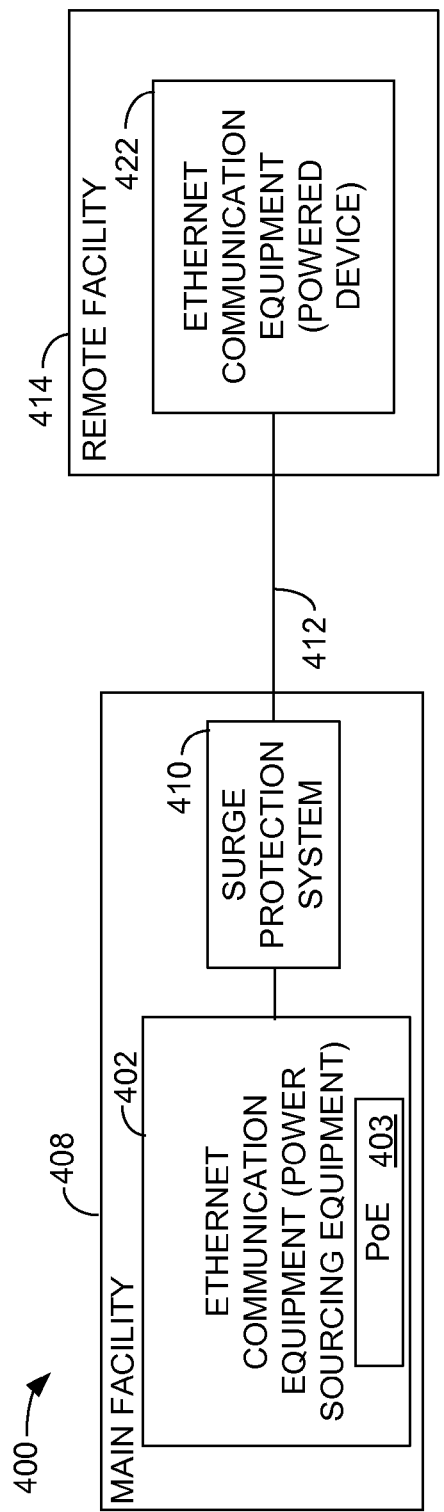
FIG. 4 is a block diagram illustrating an alternative embodiment of an implementation of the surge protection systems described herein.

FIG. 4 is a block diagram illustrating an alternative embodiment of an implementation of the surge protection systems described herein. The communication system 400 comprises a main facility 408 and a remote facility 414. The main facility 408 comprises Ethernet communication equipment 402 and a surge protection system 410. In an exemplary embodiment, the Ethernet communication equipment 402 is an embodiment of a communication system that comprises Ethernet power sourcing equipment (PSE). The Ethernet communication equipment 402 may be configured to incorporate a PoE system 403 configured to provide a nominal 48 VDC to the medium 412 to power an Ethernet powered device (PD), which will be described below. In an exemplary embodiment, the Ethernet communication equipment 422 may comprise a powered device (PD) configured to operate using PoE provided by the PoE system 403.

The surge protection system 410 may be an embodiment of the surge protection systems described above, and in an exemplary embodiment, can be configured to provide isolation from AC transient occurrences to both the Ethernet data signal and to the PoE provided by the PoE system 403 to both the Ethernet communication equipment 402 and the Ethernet communication equipment 422.

In an exemplary embodiment, the remote facility 414 is located a distance away from the main facility 408, and may be coupled to the main facility 408 over the communication medium 412, which may be an Ethernet communication link as described above. In an exemplary embodiment, the communication medium 412 is configured to carry an Ethernet data signal or signals and also a PoE voltage signal. The remote facility 414 comprises at least one Ethernet powered device (PD) 422, configured to receive data and power from the communication medium 412.

Figure 5:
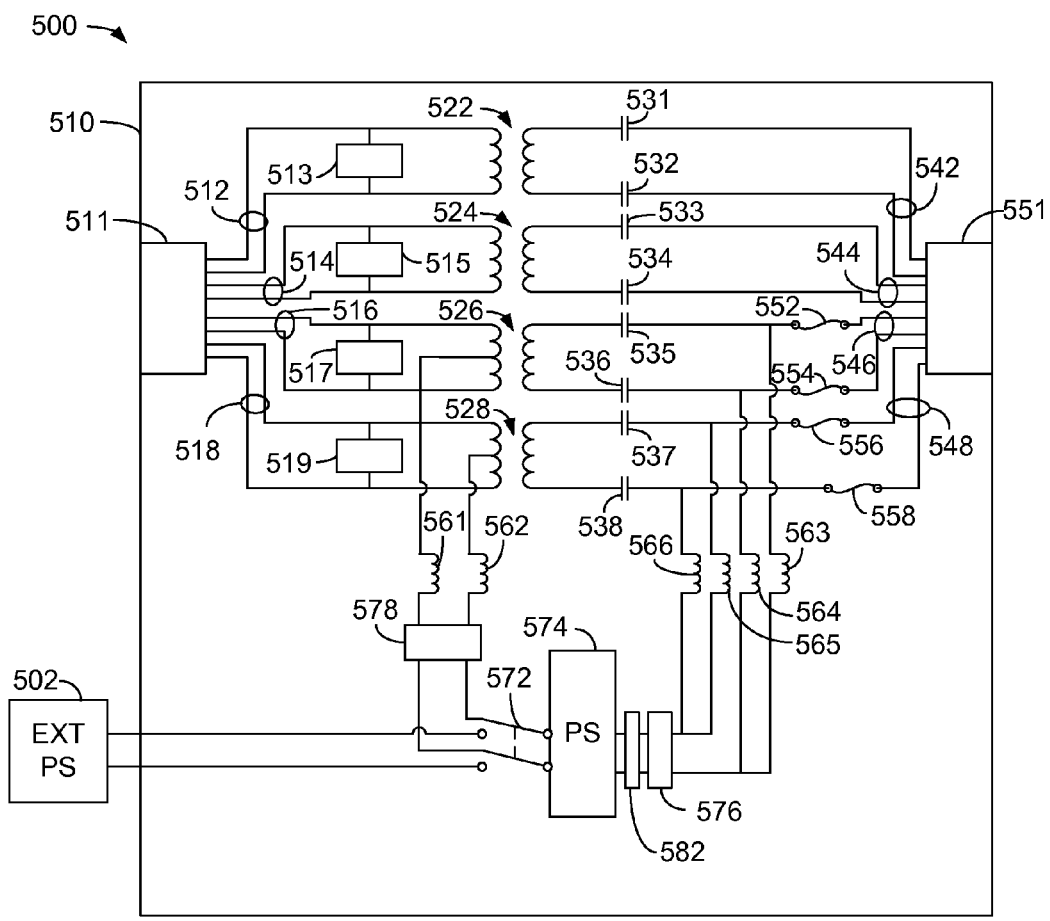
FIG. 5 is a block diagram illustrating an exemplary embodiment of a surge protection system.

FIG. 5 is a block diagram illustrating an exemplary embodiment of a surge protection system. The surge protection system 500 generally comprises a surge protection device 510 and an optional external power supply 502. In an exemplary embodiment, the optional external power supply 502 may be referred to as a "wall wart." In an exemplary embodiment, the optional external power supply 502 may be configured to provide a DC voltage of approximately 48V to the surge protection device 510; however, other voltages are possible.

The surge protection device 510 generally comprises an input port 511, a plurality of wire pairs (sometimes also referred to as "twisted pairs" and "twisted wire pairs") 512, 514, 516, 518, a plurality of isolation transformers 522, 524, 526, 528, a plurality of capacitors 531, 532, 533, 534, 535, 536, 537, 538, a plurality of wire pairs (sometimes also referred to as "twisted pairs" and "twisted wire pairs") 542, 544, 546, 548, a plurality of fuses 552, 554, 556, 558, and an output port 551. In an exemplary embodiment, the input port 511 and the output port 551 can be configured to support one or more Ethernet communication links or channels, and can be part of an Ethernet communication medium as described herein. In an exemplary embodiment, the input port 511 and the output port 551 can be configured with RJ-45 connector interfaces, configured to support one or more wire pairs. In the exemplary embodiment shown in FIG. 5, the input port 511 and the output port 551 are configured to support four (4) wire pairs, as an example only. The wire pairs 512, 514, 516 and 518 associated with the input port 511 and the wire pairs 542, 544, 54 and 548 associated with the output port 551 may be interchangeably referred to as "twisted pairs" or "twisted wire pairs."

The surge protection device 510 also comprises differential protection elements 513, 515, 517, 519, inductors 561, 562, 563, 564, 565 and 566, a power supply lightning protection element 576, a high isolation power supply 574, a PoE powered device (PD) interface 578, a PoE power source equipment (PSE) interface 582 and an optional switch 572.

The PoE powered device (PD) interface 578 provides a PD interface to a power sourcing equipment (PSE) device coupled to the input port 511. The PoE power source equipment (PSE) interface 582 provides a PSE interface to a powered device (PD) coupled to the output port 551.

The surge protection device 510 may be implemented in an environment where an Ethernet medium may extend between multiple facilities, and where the Ethernet medium may be exposed to outside plant (OSP) environmental conditions, and where the multiple facilities may be at two different ground potentials. In an exemplary embodiment, the surge protection device 510 provides both common mode and differential electrical surge protection (such as, for example, lightning protection) in harsh environments. As used herein, the term "common mode electrical surge protection" refers to a circuit that protects each circuit conductor with respect to a common node, such as, for example, ground. As used herein, a "common mode" voltage is a voltage between a common node (for example, ground) and the conductors associated with that node (for example, ground) such that the voltage of each conductor is referenced to the common node. A common mode current has a circuit path that includes the common node (for example, ground).

As used herein, the term "differential electrical surge protection" refers to a circuit that protects each circuit conductor with respect to another circuit conductor having an opposite voltage. As used herein, a "differential" voltage is a voltage that exists between two conductors, such as, for example, the voltage on a wire pair. A differential current has a circuit path that includes the two conductors, such as the two conductors of a wire pair.

The references to "common mode" and "differential mode" herein refer to a multi-conductor circuit where there are typically two or more conductors (e.g., tip-ring (the two conductors of a wire pair)), AC line voltage and AC neutral, −48V and −48 Vrtn (return), etc.) for power or signal delivery, while the signal ground is typically the common node.

The input port 511 is coupled to the isolation transformers 522, 524, 526 and 528 by respective wire pairs 512, 514, 516 and 518. Each wire pair 512, 514, 516 and 518 comprises a respective differential protection element 513, 515, 517 and 519. Each differential protection element 513, 515, 517 and 519 comprises circuitry configured to provide electrical surge protection against voltage surges between the respective conductors of the respective wire pairs 512, 514, 516 and 518.

The isolation transformer 522 is coupled to the output port 551 through a pair of capacitors 531 and 532, and wire pair 542. The isolation transformer 524 is coupled to the output port 551 through a pair of capacitors 533 and 534, and wire pair 544. The isolation transformer 526 is coupled to the output port 551 through a pair of capacitors 535 and 536, fuses 552 and 554, and wire pair 546. The isolation transformer 528 is coupled to the output port 551 through a pair of capacitors 537 and 538, fuses 556 and 558, and wire pair 548.

In an exemplary embodiment, the side of the isolation transformers 522, 524, 526 and 528 that faces the input port 511 is referred to as the "line side" of the isolation transformer and the side of the isolation transformers 522, 524, 526 and 528 that faces the output port 551 is referred to as the "chip side" of the isolation transformer.

In an exemplary embodiment, the inductors 561 and 562 are coupled to a center tap of the line side of respective isolation transformers 526 and 528. The inductors 561 and 562 are also coupled to the PoE PD interface 578. The inductors 563 and 564 are coupled to the wire pair 546 and the inductors 565 and 566 are coupled to the wire pair 548.

In an exemplary embodiment, the high isolation power supply 574 can be configured to provide at least 6 kiloVolts (kV) of ground potential rise (GPR) impulse protection, and can be configured as a 48V DC/DC converter that can pass the DC voltage signal from the input port 511 to the output port 551. In an exemplary embodiment, power in the form of a 48 VDC voltage, in this embodiment, is provided by power sourcing equipment (PSE) (not shown, but typically Ethernet equipment coupled to the input port 511) through the input port 511 over wire pairs 516 and 518. The DC voltage is taken from a center tap coupled to the line side of each of the transformers 526 and 528, directed through the inductors 561 and 562, through the PoE PSE interface 578, through the optional switch 572, and provided to an input of the high isolation power supply 574. The inductors 561 and 562 are configured as low pass filters that can pass the DC voltage signal, but not an Ethernet data signal that may be present on the wire pairs 516 and 518.

The DC voltage, in an exemplary embodiment at a level of −48 VDC, from the power sourcing equipment (PSE) connected via the input port 511, or optionally, from the external power supply 502, depending on the position of the switch 572, provides input power for the high isolation power supply 574, which in turn provides power for a powered device (PD) coupled to the output port 551. In an exemplary embodiment, the −48 VDC output of the high isolation power supply 574 is coupled through the PoE PSE interface 582, to the power supply lightning protector 576, and then to the inductors 563, 564, 565 and 566. The inductors 563, 564, 565 and 566 function as low pass filters that pass the DC voltage signal, but block an Ethernet data signal. The power supply lightning protector 576 is coupled to the PoE PSE interface 582. The PoE PSE interface 582 is coupled to the high isolation power supply 574. The power supply lightning protector 576 protects the high isolation power supply 574 from surges on the Ethernet cable coupled to the output port 551. The isolation characteristics of the high isolation power supply 574 further limit electrical or other power surges from being coupled to the Ethernet communication equipment 402 in the embodiment shown in FIG. 4.

In an exemplary embodiment, the isolation transformers 522, 524, 526, 528 are also configured to provide at least 6 kV of ground potential rise (GPR) impulse protection to the Ethernet data signals that may exist on respective wire pairs 512, 514, 516 and 518, and respective wire pairs 542, 544, 546 and 548. In this manner, any ground potential rise of approximately 6 kV or less will not be transferred across the isolation transformers 522, 524, 526, 528, and will thereby isolate any equipment coupled to the input port 511 and the output port 551.

In an exemplary embodiment, the capacitors 531, 532, 533, 534, 535, 536, 537 and 538 are configured as DC blocking capacitors (high pass filters) that pass the Ethernet data signal to the output port 551, but prevent the passage of any DC voltages (such as parasitic DC voltages or any other DC voltage) to the isolation transformers 522, 524, 526 and 528, and to provide additional power fault protection.

In an exemplary embodiment, the fuses 552, 554, 556 and 558 provide additional overload protection for any powered device (PD) coupled to the output port 551.

Although shown only on the wire pairs 516 and 518 on the input side, and only on wire pairs 546 and 548 on the output side, the PoE signal may be provided on more or fewer of the wire pairs.

In an exemplary embodiment, the optional switch 572 is configured to switch between receiving the DC voltage from the line side of the transformers 526 and 528 as described above, or receiving a DC voltage from the optional power supply 502. In an exemplary embodiment, it may be advantageous to provide a DC voltage to the surge protection device 510 (and to a powered device coupled to the output port 551) externally and not from power sourcing equipment (not shown) coupled to the input port 511. In such an embodiment, Ethernet data may be provided to the input port 511 as described above, but the external power supply 502 may be the only source of DC power provided to the high isolation power supply 574. The optional power supply 502 allows the surge protection system 500 to power an Ethernet powered device coupled to the output port 551 even if the Ethernet device coupled to the input port 511 is not a power sourcing Ethernet device or a powered Ethernet switch. In such an exemplary embodiment, the surge protection system 500 can be used as a midspan power injector with a protected output suitable for outdoor cable service.

In an exemplary embodiment, the surge protection device 510 is not coupled directly to signal ground, or any other ground, while providing the above-mentioned ground potential rise (GPR) protection and common mode protection. The ground potential rise (GPR) protection and common mode protection allow for the PoE voltage to be provided to a powered device (PD) through the output port 551 while minimizing the possibility of GPR-based damage (such as lightening) to the power sourcing equipment (PSE) coupled to the input port 511. In an exemplary embodiment, to provide protection and isolation for the Ethernet communication equipment coupled to the surge protection device 510 while providing conveyance for Ethernet data signal output, the signal and voltage which comprise the PoE output at the output port 551 are separately isolated as described herein and then re-combined on the output-side of the surge protection device 510. The inductors 563, 564, 565, 566 and the capacitors 531 through 538 recombine the Ethernet data signal and DC voltage into a compound signal that is provided to the output port 551.

Figure 6:
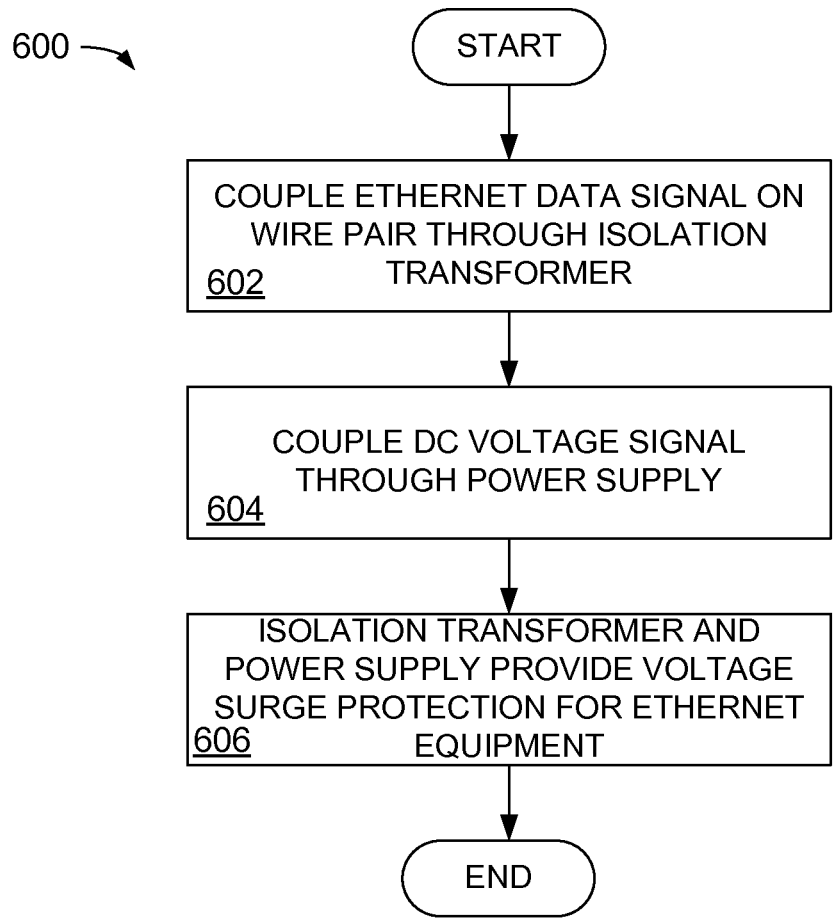
FIG. 6 is a flowchart illustrating an exemplary embodiment of a method for providing isolation and protection for power over Ethernet (PoE).

FIG. 6 is a flowchart illustrating an exemplary embodiment of a method 600 for providing isolation and protection for PoE. The blocks in the method 600 can be performed in or out of the order shown. The description of the method 600 will relate to the embodiment of the surge protection device 510 shown in FIG. 5 for convenience of description only. The method 600 applies to other embodiments of the surge protection device as well.

In block 602, an Ethernet data signal on a wire pair is coupled through an isolation transformer. For example, an Ethernet signal on wire pair 516 is coupled to the isolation transformer 526, and then coupled from the isolation transformer 526 to the wire pair 546 via the capacitors 535 and 536.

In block 604, a DC voltage signal comprising an embodiment of a PoE signal is coupled through a high isolation power supply. For example, a DC voltage signal on wire pair 516 is coupled to the high isolation power supply 574 and then coupled from the high isolation power supply 574 to the wire pair 546.

In block 606, the isolation transformer and the high isolation power supply provide voltage surge protection for Ethernet equipment coupled to the surge protection device 510. For example, the isolation transformer 526 provides voltage surge protection for Ethernet equipment coupled to the wire pair 516. In an exemplary embodiment, the isolation transformers 522, 524, 526 and 528 provide voltage surge protection for the power sourcing equipment (PSE) device (not shown) that may be coupled to the input port 511. The high isolation power supply 574 provides voltage surge protection for Ethernet equipment coupled to the surge protection device 510. In an exemplary embodiment, the high isolation power supply 574 provides voltage surge protection for the power sourcing equipment (PSE) device (not shown) that may be coupled to the input port 511.

Figure 7:
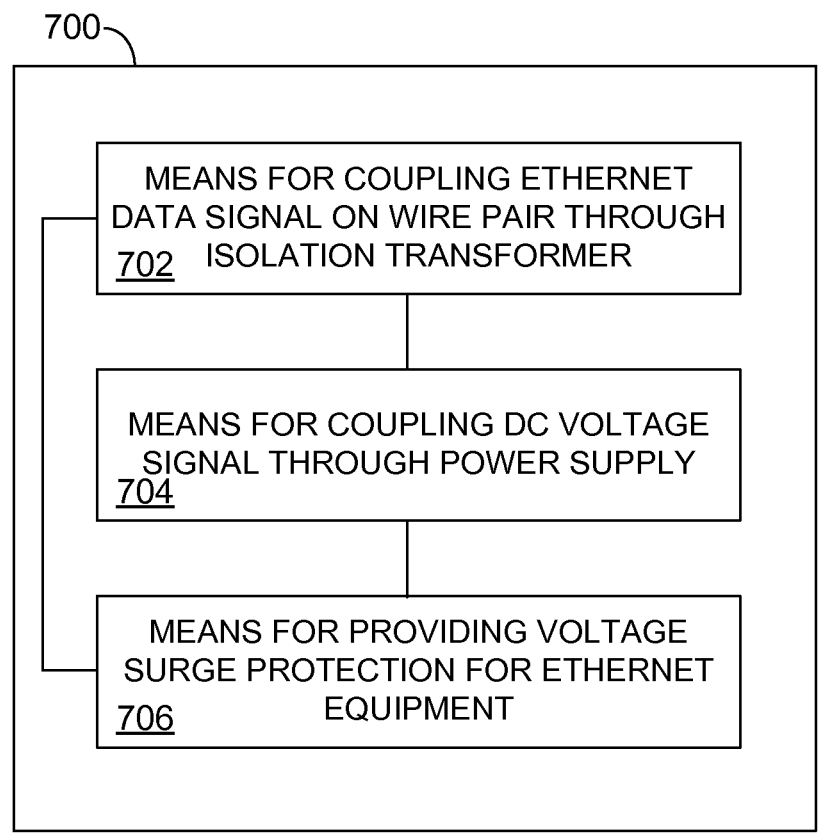
FIG. 7 is a functional block diagram of an apparatus for providing isolation and protection for power over Ethernet (PoE).

FIG. 7 is a functional block diagram of an apparatus 700 for providing isolation and protection for PoE. The apparatus 700 comprises means 702 for coupling an Ethernet data signal on a wire pair through an isolation transformer. In certain embodiments, the means 702 for coupling an Ethernet data signal on a wire pair through an isolation transformer can be configured to perform one or more of the functions described in operation block 602 of method 600 (FIG. 6). In an exemplary embodiment, the means 702 for coupling an Ethernet data signal on a wire pair through an isolation transformer may comprise coupling an Ethernet signal on wire pair 516 to the isolation transformer 526 and then from the isolation transformer 526 to the wire pair 546 via the capacitors 535 and 536.

The apparatus 700 further comprises means 704 for coupling a DC voltage signal comprising an embodiment of a PoE signal through a high isolation power supply. In certain embodiments, the means 704 for coupling a DC voltage signal comprising an embodiment of a PoE signal through a high isolation power supply can be configured to perform one or more of the function described in operation block 604 of method 600 (FIG. 6). In an exemplary embodiment, the means 704 for coupling a DC voltage signal comprising an embodiment of a PoE signal through a high isolation power supply may comprise coupling a DC voltage signal on wire pair 516 to the high isolation power supply 574 and then from the high isolation power supply 574 to the wire pair 546.

The apparatus 700 further comprises means 706 for providing voltage surge protection for Ethernet equipment coupled to the surge protection device 510. In certain embodiments, the means 706 for providing voltage surge protection for Ethernet equipment coupled to the surge protection device 510 can be configured to perform one or more of the functions described in operation block 606 of method 600 (FIG. 6). In an exemplary embodiment, the means 706 for providing voltage surge protection for Ethernet equipment coupled to the surge protection device 510 may comprise the isolation transformer 526 and the high isolation power supply 574 providing voltage surge protection for Ethernet equipment coupled to the wire pair 516. In an exemplary embodiment, the isolation transformers 522, 524, 526 and 528 provide voltage surge protection for the power sourcing equipment (PSE) device (not shown) that may be coupled to the input port 511. In an exemplary embodiment, the means 706 for providing voltage surge protection for Ethernet equipment coupled to the surge protection device 510 may comprise the high isolation power supply 574 providing voltage surge protection for Ethernet equipment coupled to the surge protection device 510. In an exemplary embodiment, the high isolation power supply 574 provides voltage surge protection for the power sourcing equipment (PSE) device (not shown) that may be coupled to the input port 511.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

While exemplary embodiments of a protection device have been described, those having ordinary skill in the art will recognize that other commonly known and used elements, components and structures have been excluded from the figures and discussion for clarity purposes since those elements do not contribute to the novelty of the exemplary embodiments of the protection device described herein.

While various embodiments of the invention have been described, it will be apparent to those of ordinary skill in the art that many more embodiments and implementations are possible that are within the scope of this invention.

What is claimed is:

1. A surge protection device, comprising:
   an isolating transformer configured to conduct an Ethernet data signal on a wire pair and configured to provide voltage surge protection for Ethernet equipment coupled to the wire pair;
   a power supply coupled to the isolating transformer and configured to conduct a DC voltage signal from the wire pair and configured to provide voltage surge protection for the Ethernet equipment coupled to the wire pair;
   an input port coupled to the isolating transformer by the wire pair;
   an output port coupled to the isolating transformer by a second wire pair;
   a blocking capacitor located between the isolating transformer and the output port; and
   a fuse located between the isolating transformer and the output port.

2. The surge protection device of claim 1, wherein the DC voltage signal is provided on the wire pair by power sourcing equipment (PSE) coupled to the surge protection device.

3. The surge protection device of claim 1, wherein the DC voltage signal is provided by an external power supply switchably coupled to the surge protection device.

4. The surge protection device of claim 1, further comprising a filter coupled between the isolating transformer and the power supply.

5. The surge protection device of claim 1, wherein the fuse is configured to provide overload protection for a powered device (PD) coupled to the output port.

6. The surge protection device of claim 1, wherein the isolating transformer provides at least 6 kiloVolts (kV) of ground potential rise (GPR) protection to the Ethernet equipment.

7. The surge protection device of claim 1, wherein the power supply provides at least 6 kiloVolts (kV) of ground potential rise (GPR) protection to the Ethernet equipment.

8. The surge protection device of claim 1, wherein the isolating transformer provides at least 6 kiloVolts (kV) of ground potential rise (GPR) protection to the Ethernet equipment, and the power supply simultaneously provides at least 6 kiloVolts (kV) of ground potential rise (GPR) protection to the Ethernet equipment.

9. The surge protection device of claim 1, further comprising:
    a PoE powered device (PD) interface configured to provide a PD interface to a power sourcing equipment (PSE) device coupled to the input port; and
a PoE power source equipment (PSE) interface configured to provide a PSE interface to a powered device (PD) coupled to the output port.

10. The surge protection device of claim 9, further comprising a power supply lightning protection element coupled between the PoE power source equipment (PSE) interface and the output port.

11. A method for providing high voltage isolation and protection for a Power over Ethernet (PoE) device, comprising:
    coupling Ethernet equipment to an isolation transformer configured to conduct an Ethernet data signal and configured to provide voltage surge protection for the Ethernet equipment;
    coupling a power supply to the isolating transformer, the power supply configured to conduct a DC voltage signal and configured to provide voltage surge protection for the Ethernet equipment; and
    providing at least 6 kiloVolts (kV) of ground potential rise (GPR) protection to the Ethernet equipment.

12. The method of claim 11, wherein the DC voltage signal is provided by power sourcing equipment (PSE).

13. The method of claim 11, wherein the DC voltage signal is provided by an external power supply.

14. A device, comprising:
    means for using an isolation transformer configured to conduct an Ethernet data signal and configured to provide voltage surge protection for Ethernet equipment coupled to the isolation transformer;
    means for coupling a power supply to the isolating transformer, the power supply configured to conduct a DC voltage signal and configured to provide voltage surge protection for the Ethernet equipment;
    means for filtering the Ethernet data signal; and
    means for filtering the DC voltage signal.

15. The device of claim 14, further comprising means for providing at least 6 kiloVolts (kV) of ground potential rise (GPR) protection to the Ethernet equipment.

16. A surge protection device, comprising:
    an isolating transformer configured to conduct an Ethernet data signal on a wire pair and configured to provide voltage surge protection for Ethernet equipment coupled to the wire pair;
    a power supply coupled to the isolating transformer and configured to conduct a DC voltage signal from the wire pair and configured to provide voltage surge protection for the Ethernet equipment coupled to the wire pair; and
    wherein the isolating transformer provides at least 6 kiloVolts (kV) of ground potential rise (GPR) protection to the Ethernet equipment.

17. The surge protection device of claim 16, wherein the power supply provides at least 6 kiloVolts (kV) of ground potential rise (GPR) protection to the Ethernet equipment.

18. The surge protection device of claim 16, wherein the DC voltage signal is provided on the wire pair by power sourcing equipment (PSE) coupled to the surge protection device.

19. The surge protection device of claim 16, further comprising:
    an input port coupled to the isolating transformer by the wire pair;
    an output port coupled to the isolating transformer by a second wire pair;
    a PoE powered device (PD) interface configured to provide a PD interface to a power sourcing equipment (PSE) device coupled to the input port; and
a PoE power source equipment (PSE) interface configured to provide a PSE interface to a powered device (PD) coupled to the output port.

20. The surge protection device of claim 19, further comprising a power supply lightning protection element coupled between the PoE power source equipment (PSE) interface and the output port.

* * * * *